US008734236B2

(12) United States Patent
Arezina et al.

(10) Patent No.: US 8,734,236 B2
(45) **Date of Patent: *May 27, 2014**

(54) PLAYER WAGERING ACCOUNT AND METHODS THEREOF

(71) Applicant: WMS Gaming Inc., Waukegan, IL (US)

(72) Inventors: Vladimir I. Arezina, River Forest, IL (US); Mark Gagner, West Chicago, IL (US); Jeremy M. Hornik, Chicago, IL (US); Richard T. Schwartz, Deerfield, IL (US); Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/793,042

(22) Filed: Mar. 11, 2013

(65) Prior Publication Data

US 2013/0190077 A1 Jul. 25, 2013

Related U.S. Application Data

(63) Continuation of application No. 12/304,368, filed as application No. PCT/US2007/015072 on Jun. 28, 2007, now Pat. No. 8,393,955.

(60) Provisional application No. 60/817,269, filed on Jun. 29, 2006.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.

USPC .................. 463/25; 463/16; 463/20; 463/29; 463/40; 463/41; 463/42; 273/292; 715/810; 715/758; 715/788

(58) Field of Classification Search

USPC ........ 463/16, 20, 25, 29, 40, 41, 42; 273/143, 273/292; 715/810, 758, 788

See application file for complete search history.

(56) References Cited

U.S. PATENT DOCUMENTS

| | | | |
|---|---|---|---|
| 5,674,128 | A | 10/1997 | Holch et al. |
| 5,800,269 | A | 9/1998 | Holch et al. |

(Continued)

FOREIGN PATENT DOCUMENTS

| | | |
|---|---|---|
| WO | 02/21377 | 3/2002 |
| WO | 2005/105236 | 11/2005 |

(Continued)

OTHER PUBLICATIONS

Ryan, Kim, *Short of Cash? Buy it with your cell phone. Payment chip puts impulse purchasing at your fingertips,* San Francisco Chronicle, Apr. 10, 2006.

Matthew Daly, *Gates sketches out vision for the future,* USA Today, Mar. 15, 2006.

(Continued)

*Primary Examiner* — Adetokunbo O Torimiro

(74) *Attorney, Agent, or Firm* — Nixon Peabody LLP

(57) ABSTRACT

A system for adding funds to a handheld gaming machine. The system includes a portable digital wallet that wirelessly communicates with a handheld gaming machine ("handheld"). The digital wallet stores an amount of funds or funds associated with a remotely stored player account, and is used by the player to add credits to a handheld. The credit meter may be stored remotely, though the player perceives that the funds are actually being transferred via the digital wallet. Other funding techniques include a kiosk that accepts cash or credit/debit cards and dispenses tickets or other media that encodes information representing an amount of funds. The player uses this media to add credits to the handheld. The media may be player-dependent such that the player's identity is somehow linked to the media or it may be playeragnostic such that the player's identity is not linked to the funds associated with the media.

20 Claims, 13 Drawing Sheets

(56) References Cited

U.S. PATENT DOCUMENTS

| | | | | |
|---|---|---|---|---|
| 6,048,269 | A | 4/2000 | Burns et al. | |
| 6,089,982 | A | 7/2000 | Holch et al. | |
| 6,280,328 | B1 | 8/2001 | Holch et al. | |
| 6,628,939 | B2 | 9/2003 | Paulsen | |
| 6,676,522 | B2 | 1/2004 | Rowe et al. | |
| 6,853,973 | B2 | 2/2005 | Mathews et al. | |
| 7,329,187 | B1 | 2/2008 | Holch et al. | |
| 7,344,443 | B2 | 3/2008 | Yamagishi | |
| 2001/0044337 | A1 * | 11/2001 | Rowe et al. | 463/29 |
| 2002/0034299 | A1 | 3/2002 | Charrin | |
| 2002/0173354 | A1 | 11/2002 | Winans | |
| 2002/0174020 | A1 | 11/2002 | Grey et al. | |
| 2003/0104857 | A1 | 6/2003 | Jenkins | |
| 2003/0176213 | A1 | 9/2003 | LeMay et al. | |
| 2004/0039695 | A1 | 2/2004 | Rowe | |
| 2004/0110554 | A1 | 6/2004 | Bromfield | |
| 2004/0219983 | A1 | 11/2004 | Giobbi | |
| 2004/0243504 | A1 | 12/2004 | Asher et al. | |
| 2006/0100006 | A1 | 5/2006 | Mitchell et al. | |
| 2006/0165060 | A1 | 7/2006 | Dua | |
| 2007/0087830 | A1 | 4/2007 | Varma et al. | |

FOREIGN PATENT DOCUMENTS

| | | |
|---|---|---|
| WO | 2006/005073 | 1/2006 |
| WO | 2008/005302 | 1/2008 |
| WO | 2008/039402 | 4/2008 |

OTHER PUBLICATIONS

*Gates says mobile will become 'digital wallet'*, The Sydney Morning Herald, Mar. 16, 2006.

Written Opinion corresponding to co-pending International Patent Application Serial No. PCT/US2007/15068, United States Patent Office, dated Aug. 13, 2008, 7 pages.

International Search Report corresponding to co-pending International Patent Application Serial No. PCT/US2007/15068, United States Patent Office, dated Aug. 13, 2008, 2 pages.

Written Opinion corresponding to co-pending International Patent Application Serial No. PCT/US2007/20560, United States Patent Office, dated Sep. 18, 2008, 6 pages.

International Search Report corresponding to co-pending International Patent Application Serial No. PCT/US2007/20560, United States Patent Office, dated Sep. 18, 2008, 4 pages.

Written Opinion corresponding to co-pending International Patent Application Serial No. PCT/US2007/15072, United States Patent Office, dated Sep. 11, 2008, 3 pages.

International Search Report corresponding to co-pending International Patent Application Serial No. PCT/US2007/15072, United States Patent Office, dated Sep. 11, 2008, 2 pages.

Written Opinion corresponding to co-pending International Patent Application Serial No. PCT/US2007/17027, United States Patent Office, dated Mar. 13, 2008, 2008, 6 pages.

International Search Report corresponding to co-pending International Patent Application Serial No. PCT/US2007/17027, United States Patent Office, dated Mar. 13, 2008, 2 pages.

* cited by examiner

PLAYER WAGERING ACCOUNT AND METHODS THEREOF

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to wagering games, and more particularly, to a player wagering account and methods thereof.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

Handheld gaming machines pose particular challenges for accepting funds in that they need to be portable. As such, incorporating a bill acceptor/validator in the handheld gaming machine would add too much bulk and weight. At the same time, methods of funding handheld gaming machines must avoid the potential for abuse or trickery and for loss of funds as they are typically stored in digital form.

Thus, a need exists for an improved apparatus and method. The present invention is directed to satisfying one or more of these needs and solving other problems.

SUMMARY OF THE INVENTION

According to an aspect, a method of transferring funds for playing a wagering game, includes: receiving an amount of funds; storing a player account associated with a player; increasing a balance of the player account by the amount of funds; crediting a credit meter associated with a wagering game playable on a handheld gaming machine; debiting the player account by the amount credited on the credit meter; and displaying the wagering game on the handheld gaming machine. The storing may be carried out on a server remote from the handheld gaming machine, the method further comprising establishing a wireless communication link between the remote server and the handheld gaming machine. The receiving may be carried out at a funding terminal communicatively linked with the remote server and the handheld gaming machine, the funding terminal accepting funds from the player.

The method may further include authorizing the transfer of the amount of funds from the player to the player account by communicating a signal between a first portable data unit and a second portable data unit, the signal representing an authorization of the transfer. The method may further include storing data representing the credit meter in a memory of the remote server. The increasing may be carried out without transferring any funds to a handheld gaming machine. The method may further include storing data representing the credit meter in a memory of the handheld gaming machine. The receiving may be carried out at the handheld gaming machine, the method further comprising scanning, at the handheld gaming machine, a ticket encoded with information representing the amount of funds.

The method may further include receiving a signal indicative of a wager amount on the wagering game and deducting the amount of the wager from the player account balance, and optionally deducting the amount of the wager from the credit meter and displaying information indicative of the credit meter on the handheld gaming machine. The funds may include cash.

According to another aspect, a method of linking a handheld gaming machine to a remote player account, includes: establishing a wireless communication link between the handheld gaming machine and a remote server; associating the player account with a player; storing the player account on the remote server, the player account having a balance; communicating a signal to the remote server, the signal representing an amount of funds; adjusting the balance of the player account in response to the communicating; and receiving a wager to play a wagering game on the handheld gaming machine. An amount of funds may be deducted commensurate with the amount of the wager in response to the receiving. The adjusting may include increasing the balance of the player account when the signal represents an amount of funds received from the player, or, alternately, decreasing the balance of the player account when the signal represents an amount of funds transferred from the player account.

The method may further include displaying a wagering game on the handheld gaming machine in response to the receiving without transferring any funds from the player account to the handheld gaming machine. The method may further include displaying a credit meter on the handheld gaming machine; and automatically adjusting the credit meter as funds are credited to or deducted from the player account without transferring any funds out of the player account. The automatically adjusting may include detecting when the level of the credit meter falls below a predetermined level.

According to a further aspect, a method of crediting funds to a player account, includes: receiving funds at a funding terminal that is coupled to a remote server; storing a player account in the remote server, the player account having a balance; communicating a signal to the remote server representing the amount of funds received at the funding terminal; increasing the balance of the player account by the amount of funds; crediting a credit meter displayed on a handheld gaming machine; and receiving a wager to play a wagering game on the handheld gaming machine. The communicating may be carried out by the funding terminal.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
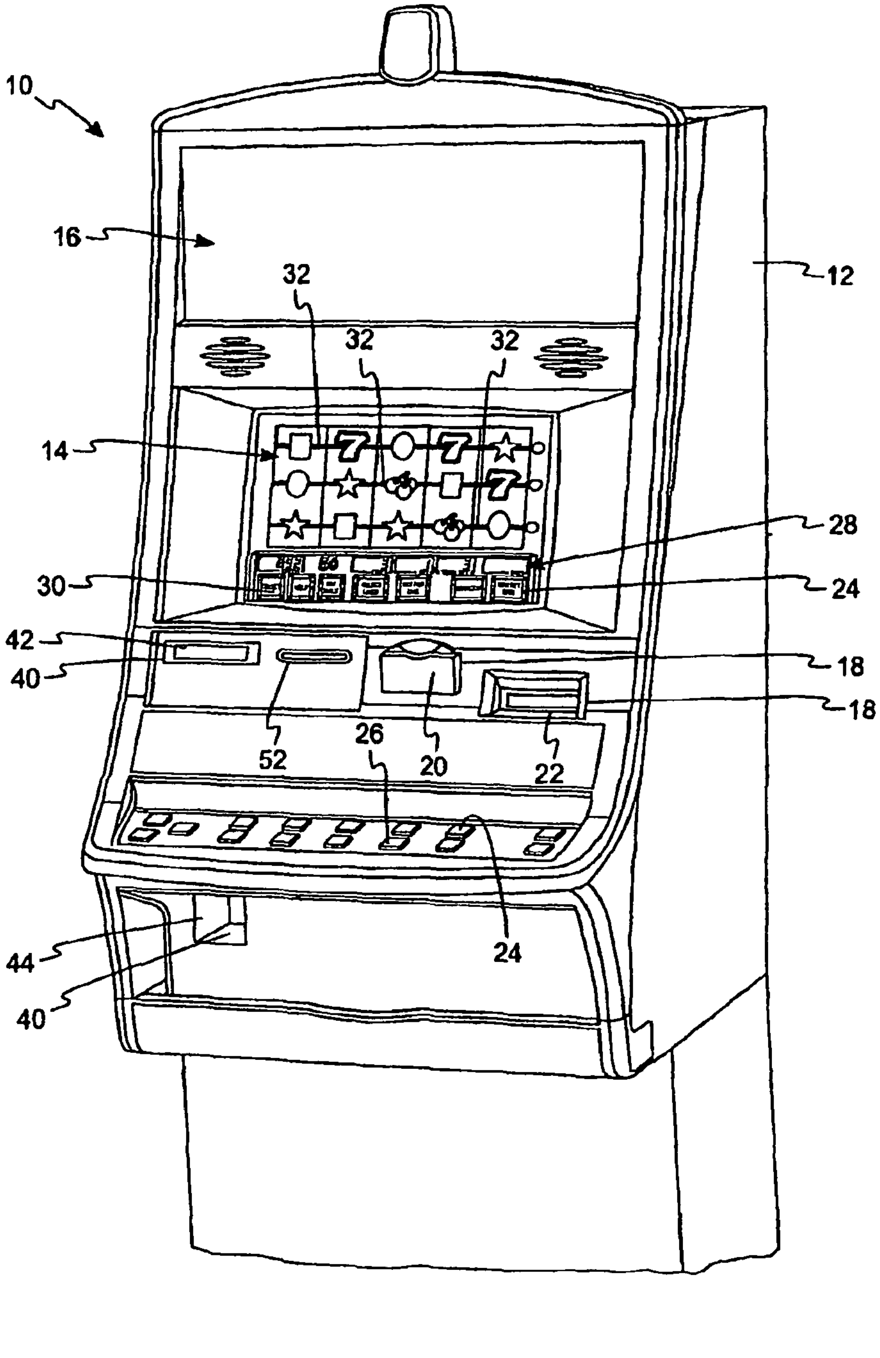
FIG. 1*a* is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
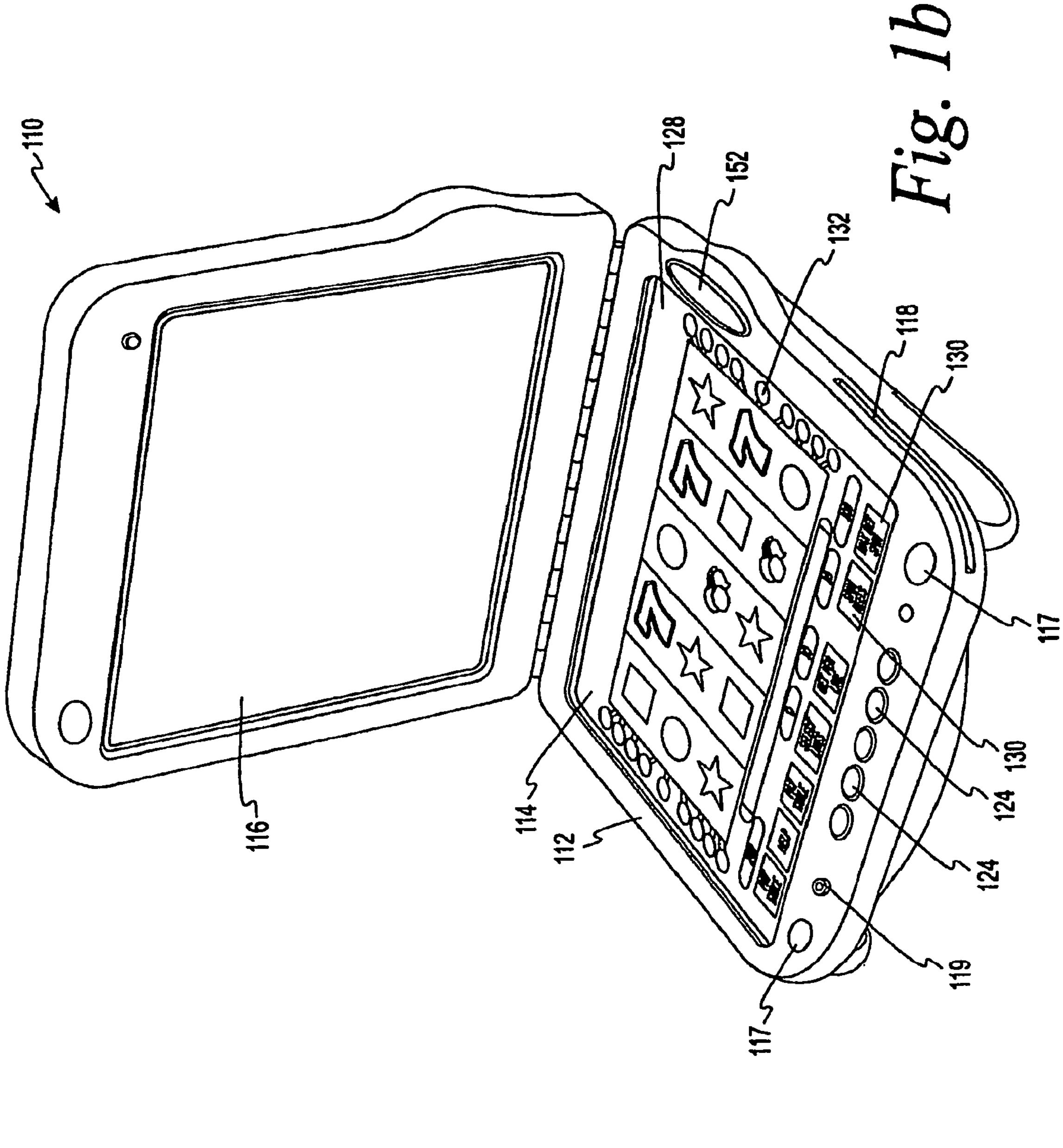
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, blackjack, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons 126 on a button panel for operating the handheld gaming machine 110. In addition, or alternatively, the player input device 124 may comprise a touch screen mounted to a primary display 114 and/or secondary display 116. In one aspect, the touch screen is matched to a display screen having one or more selectable touch keys 130 selectable by a user's touching of the associated area of the screen using a finger or a tool, such as a stylus pointer. A player enables a desired function either by touching the touch screen at an appropriate touch key 130 or by pressing an appropriate push button 126 on the button panel. The touch keys 130 may be used to implement the same functions as push buttons 126. Alternatively, the push buttons 126 may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 10. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1, comprises a biometric sensing device.

Figure 2:
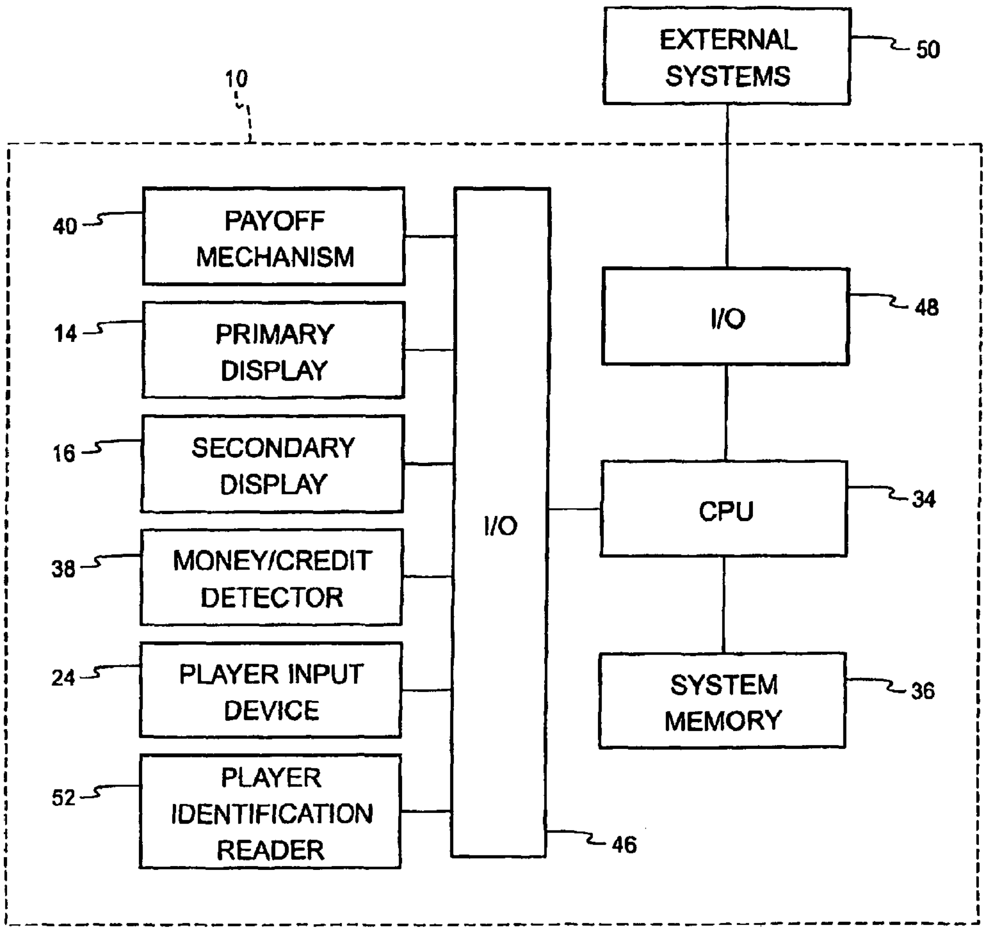
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10 bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10, 110 may communicate with external systems 50 (in a wired or wireless manner) such that each machine operates as a "thin client," having relatively less functionality, a "thick client," having relatively more functionality, or through any range of functionality therebetween. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "thicker client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal digital assistant (PDA), a counter top or bar top gaming machine, or other personal electronic device such as a portable television, MP3 player, entertainment device, etc.

Figure 3:
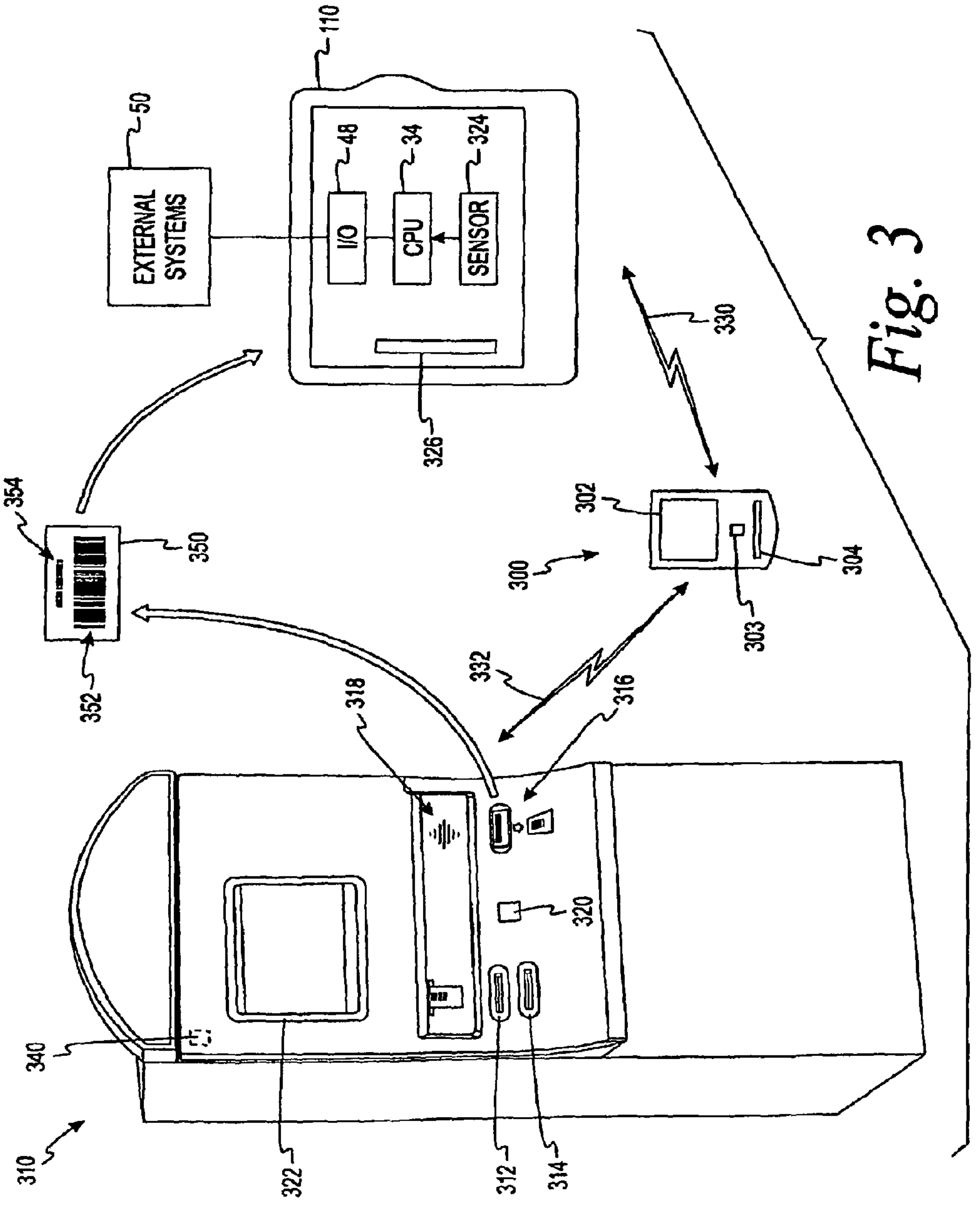
FIG. 3 is a functional diagram of a funding system according to an embodiment of the present invention.

FIG. 3 is a functional diagram of a system for adding funds to a handheld gaming machine 110. A portable data unit 300 communicates with the handheld gaming machine 110 via a wired or wireless communication link 330. The portable data unit 300 can also communicate with a kiosk or funding terminal 310 via a wired or wireless communication link 332. The portable data unit 300 includes a display 302, and a communication interface 304 for enabling communications via the communication links 330, 332. The portable data unit 300 may, in different embodiments, be a digital wallet, a mobile phone, a PDA, a smart card, a token, a dongle, a fob, a wristband, and the like. The portable data unit 300 may be linked to an online payment account such as a PayPal® account, available from eBay, Inc. For example, the player's mobile telephone number can be linked to a PayPal® account and funds can be transferred by sending a text message to the PayPal service. The mobile telephone 300 includes a near field communications chip 304 that wirelessly transmits funds to a sensor 324 of the handheld gaming machine 110 via the communication link 330. The funds may be deducted from the player's PayPal® account or may be charged directly to the player's mobile telephone bill. The display 302 of the portable data unit 300 may be an electronic paper display or a liquid crystal display.

The handheld gaming machine 110 includes a communication interface 326, which may be part of or separate from the I/O circuit 48. The communication interface 326 enables communication via the communication link 330. The communication link may utilize any convention wired or wireless protocol, including Ethernet, 802.11, Bluetooth, USB, cellular (CDMA, GSM, and the like), and so forth. Thus, the communication interfaces 304, 326 may include wireless transceivers, USB controllers, Ethernet controllers, RFID transceivers or transponders, and the like, for example. The portable data unit 300 is utilized according to the present invention to add associated funds to the handheld gaming machine 110 to enable a player to play wagering games on the handheld gaming machine. Note that the player may perceive that associated funds are being transferred to the handheld gaming machine 110, even though in fact the actual funds never leave a secure location, such as a remote server (the term "server" as used herein encompasses one or more server computers such as a server farm). Alternatively, the actual funds may be transferred to the handheld gaming machine 110, which stores the equivalent of currency in its memory. This aspect will be described in more detail in connection with FIG. 4*e* below.

The portable data unit 300 facilitates the transfer of funds or associated funds to the handheld gaming machine 110. Because the portable data unit is carried on the player's person, the player has ready access to "funds" and can, in some embodiments, quickly assess the amount of remaining "funds" associated with the portable data unit 300. Again, the player may perceive an amount of funds via the display 302 of the portable data unit 300, though in reality the funds displayed are actually stored in a remote, secure memory. The portable data unit 300 also facilitates the recognition of the identity of the player, such as when the player attempts to "check out" a handheld gaming machine 110. For example, the player's age can be verified via the portable data unit 300. The portable data unit 300 can also, in some embodiments, enhance security by verifying a player's identity before completing a funding transaction or allowing the player to wager on a handheld gaming machine 110. If the portable data unit 300 is misplaced or stolen, because the actual funds are not physically stored on the portable data unit, the player can minimize any potential loss of funds even if the portable data unit 300 were to be compromised.

In an embodiment, the communication interfaces 304, 326, 340 include radio microchips that communicate over short distances and through obstacles by means of radio waves. The radio microchips preferably conform to the Bluetooth™ standard detailed at www.bluetooth.com. The Bluetooth radio microchips operate in the unlicensed ISM band at 2.4 GHz and avoid interference from other signals by hopping to a new frequency after transmitting or receiving an information packet. Bluetooth is a term used to describe the protocol of a short range frequency-hopping radio link between devices containing the radio microchips. These devices, which in this case may be the portable data unit 300, the handheld gaming machine 110, and the kiosk 310, are then termed "Bluetooth-enabled." The radio link replaces a data unit reader or cable that would otherwise be used to connect the portable data unit 300 with the handheld gaming machine 110 or kiosk 310. The Bluetooth technology is designed to be fully functional even in very noisy radio environments. The Bluetooth technology provides a very high transmission rate and all information may be protected by advanced error-correction methods, as well as encryption and authentication algorithms (such as RSA or DSA) for the user's privacy.

It should be understood that the handheld gaming machine 110 may store in a memory a unique identifier, signature, or other security information which may be transmitted wirelessly via the transceiver 326 to the external systems 50 to verify and authenticate the handheld gaming machine 110 as being a permissible participant in the system 50. Any one of a variety of secure identification and authentication mechanisms may be used to perform such verification.

The kiosk or funding terminal 310 is a floor-standing device that includes a bill validator/acceptor 312, a credit/debit card acceptor 314, a ticket/cash dispenser 316, a speaker or speakers 318, a sensor 320 (such as an IR sensor or a biometric sensor for sensing a biometric such as a fingerprint, a retina, or a voice pattern), a display 322, and a communication interface 340. A purpose of the kiosk 310 is to accept cash or cash equivalents from a player and to transfer those associated funds (either as perceived or in reality) to a handheld gaming machine 110 either directly or via a portable data unit 300. The ticket/cash dispenser 316 can dispense, in addition to currency bills, a barcoded ticket 350 having one or more barcodes 352, 354 imprinted thereon, which represent an amount of associated funds, an identifier, and the like. The handheld gaming machine 110 includes a sensor 324, which may include a barcode scanner, that scans the barcode(s) 352, 354 on the barcoded ticket 350. Upon validation, the handheld gaming machine 110 can credit the player's credit meter by an amount commensurate with the amount of associated funds encoded on the barcoded ticket 350. Alternatively, the sensor 324 may be a full image scanner, which scans an image of the ticket 350 and stores it for record-keeping purposes (such as to provide proof that the player "cashed" a ticket). In embodiments where the sensor 320 includes a biometric sensor, the biometric sensor is operable to authenticate a player before permitting the player to complete a funding transaction.

According to a specific embodiment, a player may add funds to the handheld gaming machine 110 by inserting currency into the bill acceptor 312 in the kiosk 310. The kiosk 310 communicates a signal over the communication link 332 to the portable data unit 300 carried by the player. The signal is representative of the amount of funds added by the player at the kiosk 310. The player can use the portable data unit 300 to add associated funds to the handheld gaming machine 110. Note that the actual funds may never be stored or "transferred" to the handheld gaming machine 110 but rather may be stored on a secure server remote from the handheld gaming machine 110, as described more fully below.

According to another specific embodiment, the portable data unit 300 is not used. The player inserts cash or a credit card into the kiosk 310, which dispenses a barcoded ticket 350 to the player with one or more barcodes 352, 354 encoded with the amount of funds added via cash or credit card. The player passes the ticket 350 near the sensor 324 of the handheld gaming machine 110, which scans the barcode(s) 352, 354 to increase the number of credits available to wager on the handheld gaming machine 110 by an amount commensurate with the amount of funds associated with the ticket 350.

Multiple kiosks 310 may be disposed about the wagering environment (casino, cruise ship, hotel). Players with handheld gaming machines 110 can freely walk about the wagering environment, and when the funds run low, they can be replenished at any nearby kiosk, which are networked together to provide inter-kiosk information or information to a central source, such as a central server. Service messages may be communicated to the central source, such as a message that a bill validator receptacle is full, or the ticket paper stock is running low.

As stated above, the portable data unit 300 may be a digital wallet, and the display 302 may be of the electronic paper or LCD type, displaying information to the player such as the amount of associated funds remaining in the digital wallet, the amount of associated funds added, the amount of funds transferred to the handheld gaming machine 110, and the like.

Figure 4A:
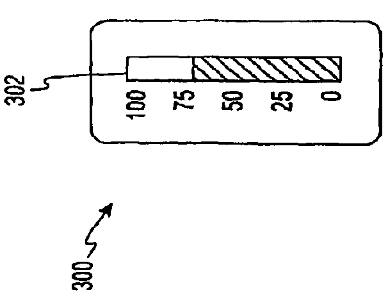
FIG. 4*a* is a functional illustration of a portable data unit configured as a fob according to an embodiment of the present invention.

FIGS. 4*a* to 4*d* illustrate other examples of a portable data unit 300. In FIG. 4*a*, the portable data unit 300 is a portable fob and the display 302 resembles a fuel gauge that indicates the amount of funds remaining that are associated with the portable fob 300. The portable fob 300 may be small enough to carry on a keyring, for example, and can include a wireless transceiver 304 capable of formatting data according to a wireless protocol such as Bluetooth.

Figure 4B:
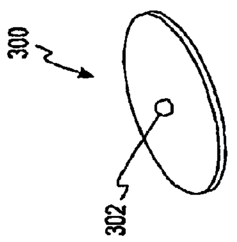
FIG. 4*b* is a functional illustration of a portable data unit configured as a token or a chip according to an embodiment of the present invention.

In FIG. 4*b*, the portable data unit 300 is a token or chip that is depletable and rechargeable, and the display 302 takes the form of an LED. The display LED 302 may light a green color to indicate the presence of associated funds on the chip 300 and a red color to indicate the absence of associated funds. The display LED 302 provides a quick visual indication to the player as to the status of associated funds remaining on the chip 300. When the LED 302 is green, the player can insert the chip 300 into or proximate to the handheld gaming machine 110 and the associated funds can be transferred to the handheld gaming machine 110. Again, it should be understood that the mere perception of the funds being transferred may be created, even though the actual funds themselves are stored in a secure, remote location, as described more fully below. Alternately, as described in connection with FIG. 4*e*, the funds may reside in a player account (also termed a wagering account) in the handheld gaming machine 110 such that funds transferred from the portable data unit 300 or from a ticket 350 are actually transferred and stored onto the handheld gaming machine 110. Either way, the player perceives that funds are being transferred, though the reality may be entirely different. The funds are "associated" with the portable data unit in that the actual funds may actually reside elsewhere, though the associated funds are linked to the actual funds such that depletion of an associated fund will cause the actual funds to be depleted by a commensurate amount.

Figure 4C:
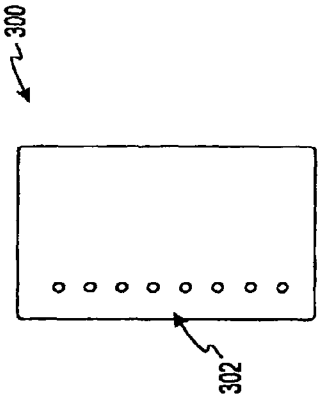
FIG. 4*c* is a functional illustration of a portable data unit configured as a wireless-enabled card according to an embodiment of the present invention.

In FIG. 4*c*, the portable data unit 300 resembles a card and has the approximate dimensions of a credit card or playing card. The display 302 includes an array of organic LEDs (OLEDs) that can change color. For example, the OLEDs may be red to indicate the absence of funds associated with the portable data unit 300. The OLEDs may gradually shift color from red to green (e.g., from red, to orange, to yellow, to green, and all intermediate shades therebetween) to indicate different levels of funds associated with the portable data unit 300. The card 300 may be of the "smart card" type and its communication interface 304 may include a wireless transceiver adapted to format communications according to the Bluetooth standard or a WiFi standard. Alternately, the communication interface 304 may be a conventional magnetic strip (such as a passive RFID transponder) that encodes at least information representative of the associated funds thereon. In an embodiment where the card 300 includes an RFID transponder, the player need only wave the card 300 proximate to the gaming machine 10, 110. The card 300 can serve as a player tracking card, where the information encoded on the RFID tag includes any combination of player identification information, player preferences, casino preferences, player tracking information, machine data, and player account information. In another embodiment, the display 302 includes an electronic paper display.

The player preferences generally relate to the values of those parameters that players have selected in establishing their preferred handheld gaming machine configuration. The player preferences may include the preferred game (game type), the preferred configuration of the handheld gaming machine (language, sound options, speed of reel spins, number of coins played per game or pull), and the preferred distribution of awards (payout structure, payout options, form of complimentaries, currency). The casino preferences reflect certain parameters that casinos can adjust according to certain criteria, such as skill level or playing frequency, to maintain the interest of its players. The casino preferences may include hold percentage, complimentary award rate, complimentary award limits, game eligibility (lockout), and other information. Hold percentage indicates a range of hold percentages, such as high, medium, and low.

The machine data may include a machine ID; the number of coins played; the number of tokens or tickets in the handheld gaming machine 110; the amount paid out by the machine; the number of games played; the number of coins paid by attendants to players; and such security information as the number of blackouts (i.e., interruptions of electrical power to the machine), and the last ten security events such as illegal pays. Along with the data as described above, appropriate date-time information corresponding to the data may be recorded on the portable data unit 300.

Figure 4D:
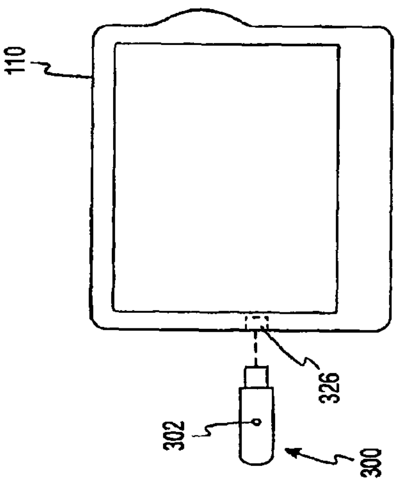
FIG. 4*d* is a functional illustration of a portable data unit configured as a dongle according to an embodiment of the present invention.

In FIG. 4*d*, the portable data unit 300 is a portable dongle having a connector as part of the communication interface 304. The connector 304 plugs into a corresponding connector 326 in the handheld gaming machine 110. The communication interface 304, 326 may be of the USB type, for example. The display 302 of the dongle may be a color-shifting LED, electronic paper, or an array of OLEDs to indicate the presence or absence of funds associated with the dongle 300. Alternately, in other embodiments, the portable data unit 300 may be incorporated in a typical portable device such as a mobile (cell) telephone, watch, necklace, ring, belt buckle, keyring, a wristband, or any other typical device carried by casino patrons.

The present invention may also be used for the purpose of preventing unauthorized use of the handheld gaming machines in addition to facilitating fund transfers. For example, if the portable data unit 300 is incorporated into a tamperproof wristband with an RFID transponder or transceiver, the wristband could be used to prevent unauthorized use by, for example, minors. The RFID transponder on the wristband 300 would have to be detected at various time intervals by a corresponding RFID transceiver on the handheld gaming machine 110 in order to allow use of the handheld gaming machine 110. If a proper RFID tag is not detected, the handheld gaming machine 110 can be disabled. Thus, if a minor picks up a handheld gaming machine 110, any attempt to play a wagering game on the handheld gaming machine would be thwarted because the minor would not be wearing the approved wristband. The minor may be presented instead with a video game, for example, or other appropriate form of wager-free entertainment.

Figure 4E:
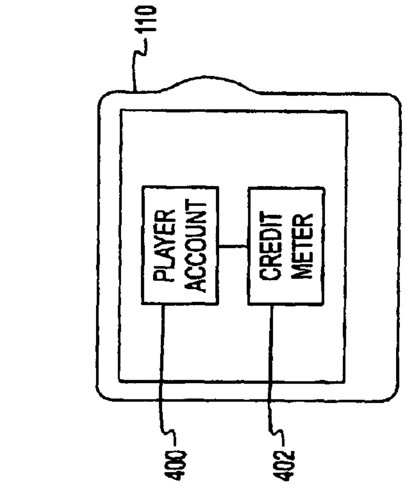
FIG. 4*e* is a functional diagram of a handheld gaming machine having a player account and a credit meter according to an embodiment of the present invention.

A player or wagering account may be stored on or accessible by the handheld gaming machine 110. This embodiment is shown in FIG. 4*e*, in which a player account 400 resides on the handheld gaming machine 110 and is linked to a credit meter 402. Funds from the player account 400 can be transferred to the credit meter directly. The player account 400 may store actual funds or may store an associated amount of funds. The player account 400 includes identification information such as the identity of the player, and other player preferences or casino preferences.

Figure 5A:
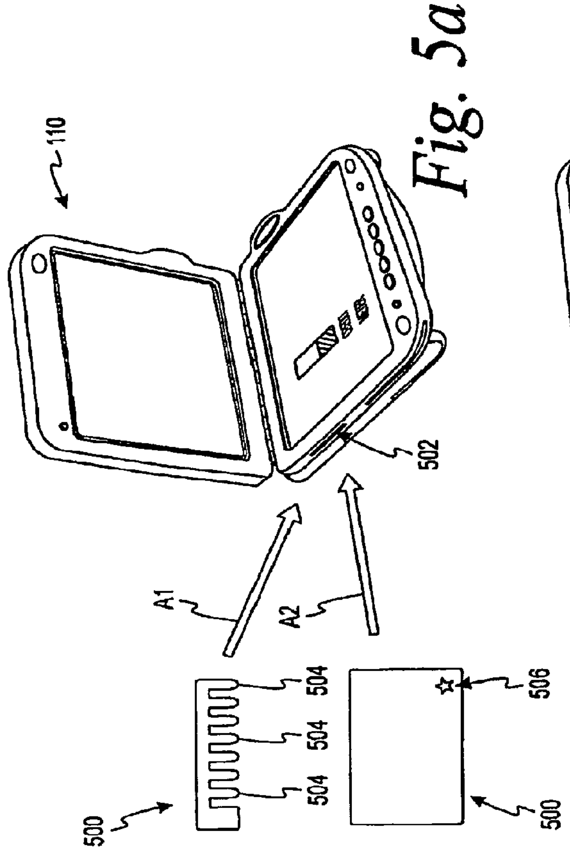
FIGS. 5*a* and 5*b* are functional illustrations of a system and player-independent methods for adding funds to a handheld gaming machine according to an embodiment of the present invention.
Figure 5B:
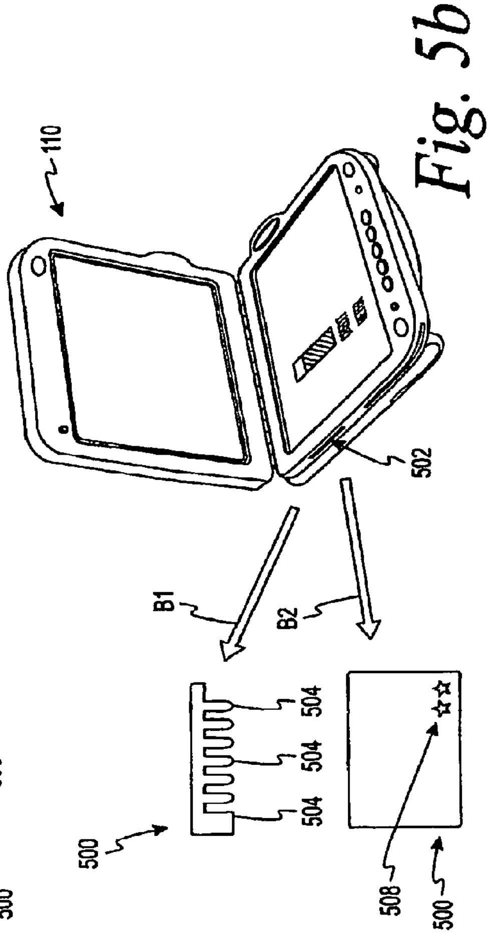

FIGS. 5*a* and 5*b* illustrate a system for adding funds to a handheld gaming machine 110 that is player "agnostic" or player independent in that there is no identifiable information linked to the player such that his or her identity can be determined. These cash substitutes resemble cash in that the player's identity can remain anonymous. FIG. 5*a* shows two different types of substitute currency media 500 in the form of a strip with removable "teeth," each representing an amount of value, such as $1.00 and in the form of a card with punchable holes, each hole representing an amount of value. The currency substitute media 500 is inserted (A1) into a slot 502 in the handheld gaming machine 110 that may display a credit meter. After insertion, one of the teeth of the substitute currency media 500 is broken off inside the handheld gaming machine 110 by mechanical means, and the substitute currency media 500 is withdrawn (B1) from the handheld gaming machine 110 while the credit meter is updated to reflect the amount of funds added.

Alternately, the substitute currency media 500 may be a card, similar to the type used on commuter trains, which is inserted (A2) into the slot 502 of the handheld gaming machine 110. Upon insertion, a mechanical device within the handheld gaming machine 110 punches a second hole 508 into the substitute currency media 500, which is withdrawn (B2) as the credit meter is updated to reflect the amount of value added by the punching of the hole 508. The sensor 324 of the handheld gaming machine 110 detects how many holes have been punched to avoid double-punching. When the maximum number of holes have been punched into the substitute currency media 500, it may be discarded and a new one purchased. For example, each card may cost $10, and ten holes may be punched in the card, each one representing $1 of value. When the handheld gaming machine 110 is returned to the operator of the wagering environment, the operator may remove the broken teeth and hole punches before returning the handheld gaming machine 110 to another player. Other servicing needs can be performed, such as recharging the battery of the handheld gaming machine 110.

Each of the foregoing player-dependent form factors (e.g., portable digital wallet, fob, token, card, dongle) can be used to enforce a daily wagering limit upon the player, whose identity is linked directly or indirectly to the form factor itself. The daily wagering limit may be applied on a per-player basis or on a per-form factor basis. In other words, because the player's identity can be tracked by the various form factors, the wagering establishment can impose limits on the amount of wagers that a player can place or can monitor the amount of wagers being placed for signs of unhealthy or irresponsible playing behavior. If the limit is applied on a per-form factor basis, once the player reaches a daily limit for, say, the token form factors, any further attempts to use the token form factors will be (politely) rebuffed; however, the player would not be precluded from using other form factors, such as the portable digital wallet, up to that form factor's daily limit. If the limit is applied on a per-player basis, the daily usage of the player-dependent form factors is monitored by a central server, for example, in the external systems 50, and when a daily limit is reached, the player can be prevented from using player-dependent form factors (though the player may be free to use player-independent or agnostic form factors, such as a cash or other "anonymous" forms of funds).

Figure 6:
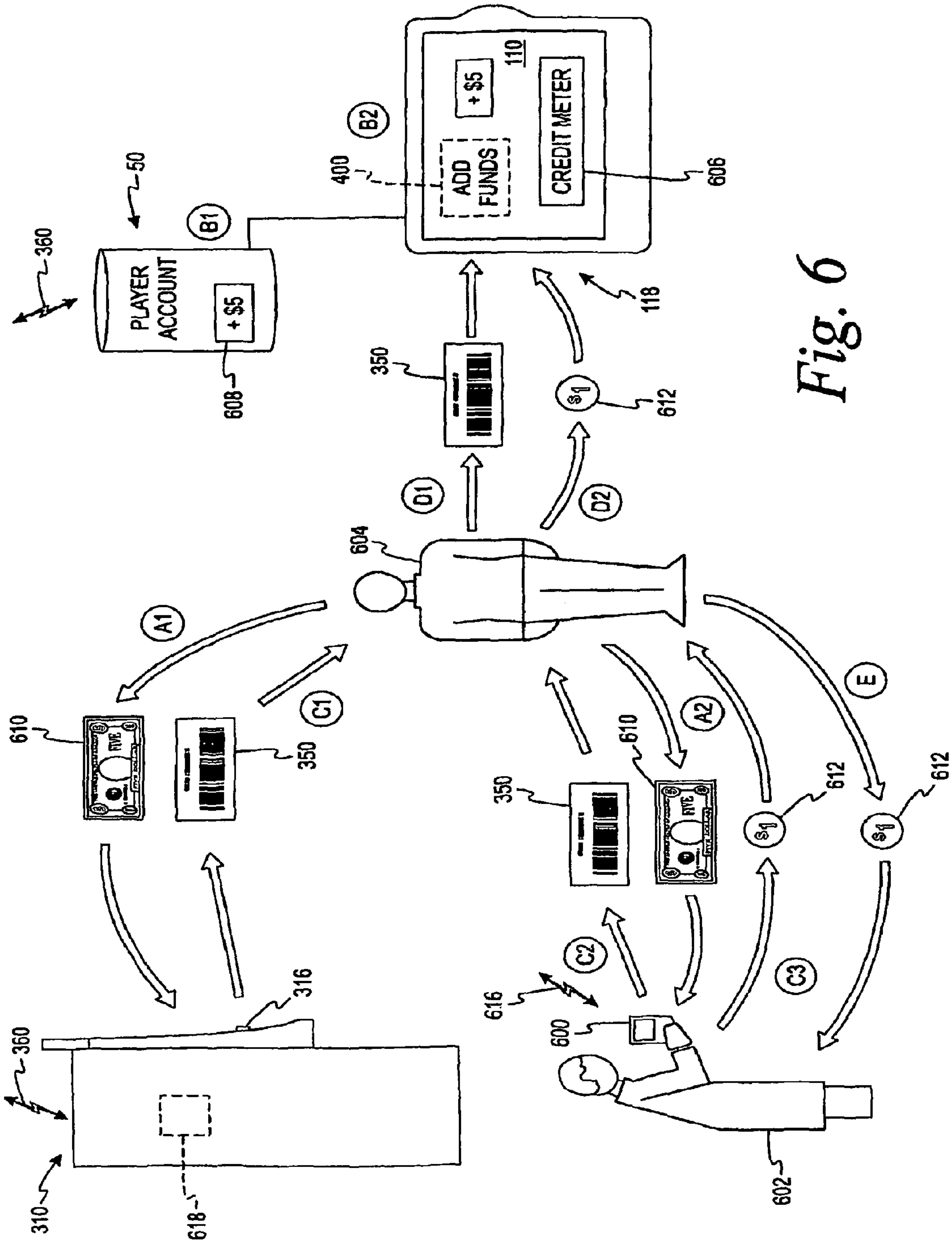
FIG. 6 is a functional block diagram of a system for adding funds or associated funds to a handheld gaming machine according to an embodiment of the present invention.

FIG. 6 is a functional block diagram of a system 600 for adding funds or associating funds with the handheld gaming device 110. A player 604 inserts cash 610 (such as a $5 currency bill) into the kiosk 310 (A1). In an embodiment, a player account 608 stored in a database of the external systems 50, such as in a remote central server, is increased by $5.00 (B1). Alternately, a player account 400 stored on the handheld gaming machine 110 is increased by $5.00 (B2). The kiosk 310 dispenses to the player 604 a barcoded ticket 350 encoded with information representing $5.00 (C1). A credit meter 606 is credited with a number of credits commensurate with the $5.00. The player 604 inserts the ticket 350 into the slot 502 or passes it proximate the sensor 324 of the handheld gaming machine 110 (D1). In the illustrated embodiment, the player can provide funds in one form factor (cash) but is dispensed funds in another form factor (ticket), which is used to place wagers on wagering games on the handheld gaming machine 110.

The kiosk 310 can include a secure memory that serves as a personal money "locker" 618 for the player. Multiple players can have their own personal money lockers 618 in the kiosk 310, where value is added to the personal money locker 618 by inserting money (or funds associated with a credit/debit card) into the bill validator/acceptor 312 or credit/debit card acceptor 314 of the kiosk 310. The funds stored in the personal money locker 618 can be independent from or linked to the player account 608 stored in a database of the external systems 50. To "empty" the personal money locker 618, the kiosk can dispense any remaining amount of funds in the personal money locker 618 to the player via a cash dispenser or can credit the player's player account 608 with the remaining amount. Note the player account may alternately reside on the handheld gaming machine 110, on a database of the external systems 50, or in the kiosk 310.

Instead of inserting cash into the kiosk 310, the player 604 may alternately give the cash 610 to an attendant 602 (A2) who carries a portable data unit 600 that dispenses a barcoded ticket 350. The portable data unit 600 includes a portable currency bill validator that validates the denomination and authenticity of a currency bill provided by the player 604. The portable data unit 600 communicates wirelessly with a remote central server via the communication links 616, 360, and the attendant 602 uses the portable data unit 600 to access the player account player account 608, 400 stored in the external system 50 or on the handheld gaming machine 110, respectively. The attendant 602 credits the player account 608, 400 by the amount of cash tendered by the player 600, and this credit may, in some embodiments, be reflected in the player account 608, 400 (B1, B2). Upon receiving confirmation of the credit to the player account 608, 400, the attendant 602 dispenses via the portable data unit 600 a barcoded ticket 350 that is handed to the player (C2). The player inserts the ticket 350 into the slot 502 or passes it proximate the sensor 324 of the handheld gaming machine 110 (D1). The credit meter 606 of the handheld gaming machine 110 is credited by all or part of the amount encoded on the ticket 350.

In an alternate embodiment, the player 604 inserts cash 610 into the kiosk 310 (A1). The kiosk 310 then dispenses a barcoded ticket 350 to the player 604 (C1). The player 604 then inserts the barcoded ticket 350 into the slot 502 or passes it proximate the sensor 324 of the handheld gaming machine (D1). The credit meter 606 is finally updated to reflect the amount of funds encoded on the barcoded ticket 350 (B2). In this embodiment, there is no player account 608 and the barcoded ticket increases player confidence by giving the player something tangible in exchange for cash.

Instead of receiving a ticket 350 from the attendant 602, the attendant can give the player 604 a token 612 (C3), such as the token shown in FIG. 4*b* or other casino gaming token representing cash value, which the player 604 inserts into the handheld gaming machine 110 or places it proximate thereto (D2) to transfer the funds associated with the token 612 to the handheld gaming machine 110. The handheld gaming machine 110 credits the credit meter 606 by all or part of the amount associated with the token 612. The player 604 returns the token 612 to the attendant 602 (E) who can "recharge" the token.

Generally, the value received (e.g., $5.00) from or dispensed to the player 604 can be converted into signals representing that value and communicated among the kiosk 310, the external system 50, and the handheld gaming machine 110. These communications can be secure, such as via conventional encryption or authentication techniques, to ensure reliable transmission and receipt of the signals.

The handheld gaming machine 110 includes a button 620 for adding funds. A player depresses this button 620, which may exist in software or hardware, to request additional funds when, for example, the credit meter 606 begins to run low. The request is transmitted to a remote central server, such as one that is included within the external system 50, which notifies an attendant 602 of the request and the location of the handheld gaming machine 110 in the wagering environment. Information representing the request, the location, the balance in the player account, the identity of the requesting player 604 (such as a photograph of the player 604), and the like is communicated to the attendant's portable data unit 600. The attendant then locates the player 604 within the wagering environment, by facial recognition or by the location of the handheld gaming machine 110, for example. Alternately, the handheld gaming machine 110 can automatically transmit an "add funds" request to the remote central server when the credit meter 606 or the player account 400 falls below a predetermined level or a level selected by the player 604.

Figure 7:
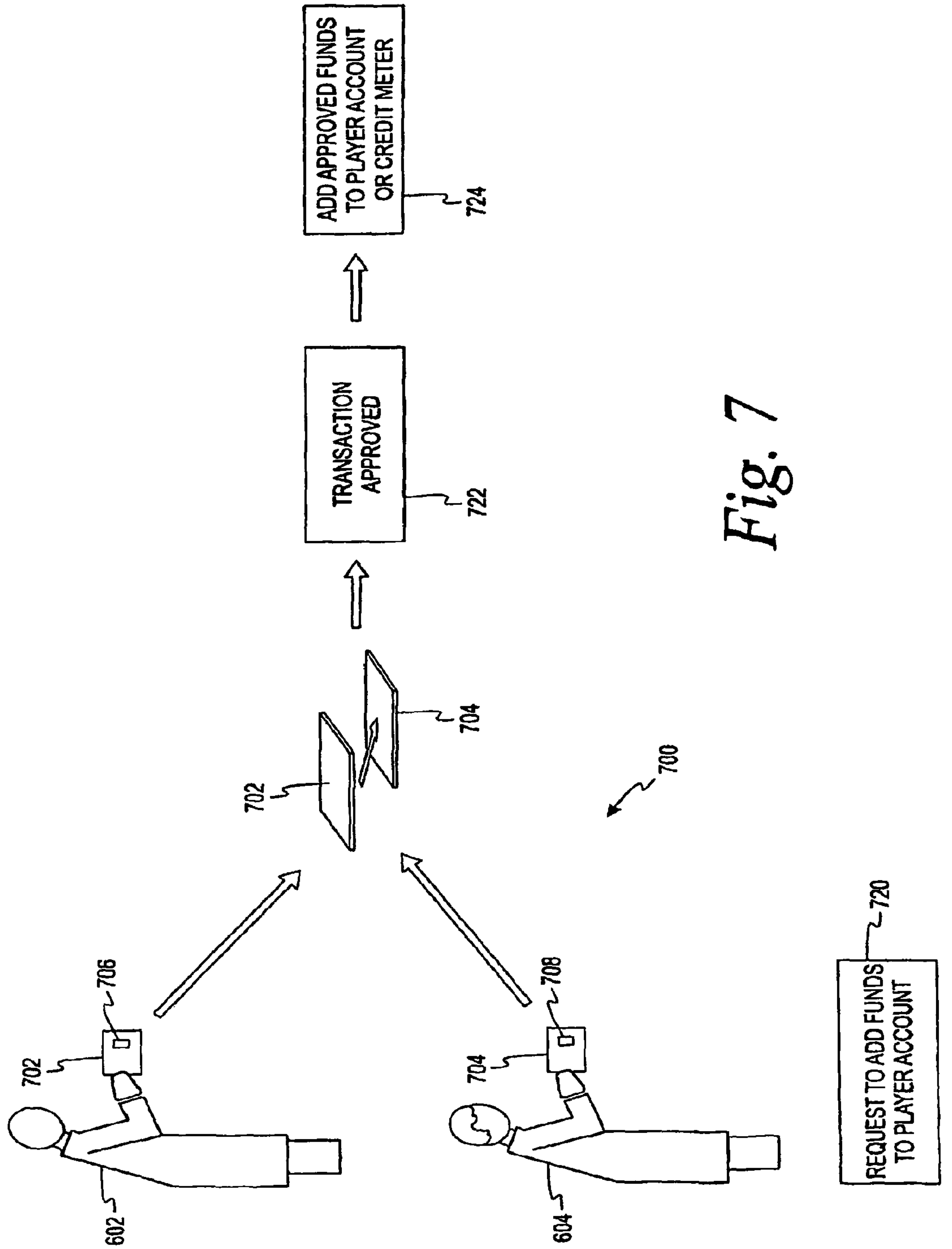
FIG. 7 is a functional diagram of an embodiment for authorizing a transaction transferring funds or associated funds to a player account or to a credit meter on a handheld gaming machine according to an embodiment of the present invention.

FIG. 7 illustrates a functional diagram of an embodiment for authorizing a transaction transferring funds or associated funds to a player account or to a credit meter on the handheld gaming machine 110. The player 604 carries a player card 704, which may be the portable data unit 300, and issues a request (720) to add funds to a player account. The attendant 602 carries an attendant card 702 (which may double as the attendant's badge, for example) and places it near or in contact with the player card 704. In an embodiment, the attendant card 702 includes an infrared (or RF) transmitter 706 and the player card 704 includes an infrared (or RF) receiver 708, and the attendant card 702 is placed such that the IR transmitter 706 is within range of the IR receiver 708. In another embodiment, the attendant card 702 includes a wireless transceiver 706, such as one adapted for short-range RF communications like Bluetooth, and the player card 704 includes a corresponding wireless transceiver 708. In another embodiment, the player card 704 is a proximity card that is detected by a corresponding reader 706 on the attendant card 702. Proximity cards and readers suitable for this embodiment are commercially available from HID Corporation. The communications between the attendant card 702 and the player card 704 can be encrypted or signed and verified by an authentication algorithm such as the Digital Signature Algorithm to prevent mischief by an unscrupulous attendant or player. If the attendant card 702 authorizes the transaction, the transaction is approved (722) and the approved funds or associated funds are added or transferred to a player account or a credit meter (724).

In an alternate embodiment, the player card 704 and the attendant card 702 may be inserted into or held proximate to the attendant portable data unit 600 shown in FIG. 6. In this embodiment, the player card 704 and the attendant card 702 may communicate with the attendant portable data unit 600 or, alternately, the attendant portable data unit 600 may be used to facilitate or relay communication between the two cards 702, 704.

Alternately, the handheld gaming machine 110 may require input of a PIN number or password known only to the attendant 602. To authorize a transaction involving a transfer of funds, the player may be required to have the attendant enter a PIN number or password on the handheld gaming machine 110 in lieu of or in addition to use of the attendant card 702. In still other embodiments, a biometric of the attendant may be required to authorize a transaction, such as a fingerprint biometric, which the attendant provides via the biometric reader 152 on the handheld gaming machine 110.

Figure 8:
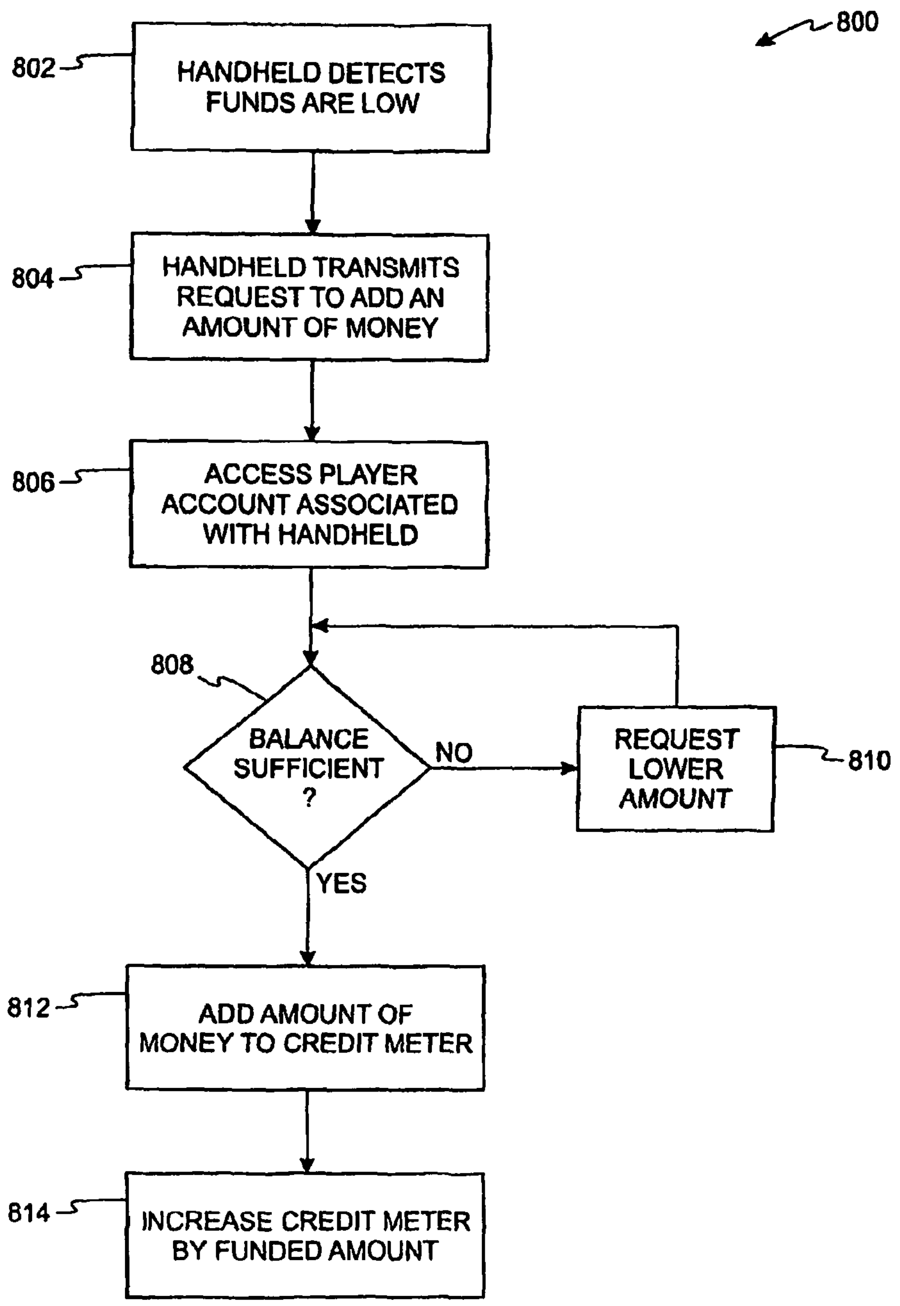
FIG. 8 is a flow chart diagram of a method of automatically transferring funds from a player account to a credit meter on a handheld gaming machine according to an embodiment of the present invention.

FIG. 8 is a flow chart diagram of a method 800 of automatically transferring funds from a player account to a credit meter on a handheld gaming machine 110 according to an embodiment of the present invention. The handheld gaming machine 110 detects that the funds associated with the machine 110 are low (802). The funds either fall below a predetermined threshold or a threshold set by the player. The handheld gaming machine 110 communicates a request to add an amount of money (804), for example, $10. A player account associated with the handheld gaming machine 110 is accessed (806) either by the handheld gaming machine 110 or by a remote central server in the external system 50. The balance in the player account is checked (808), and if there are not sufficient funds to cover the amount requested, a lower amount is requested (810). Otherwise, the amount requested is added to the credit meter of the handheld gaming machine 110 (812), and the credit meter is increased by the funded amount (814). As emphasized above, the credit meter does not necessarily indicate that any funds actually reside on the handheld gaming machine 110. Rather, the credit meter creates the perception that the funds actually reside on the handheld gaming machine 110 even though in fact they may be tracked and stored in a remote location, such as in a remote central server.

Figure 9:
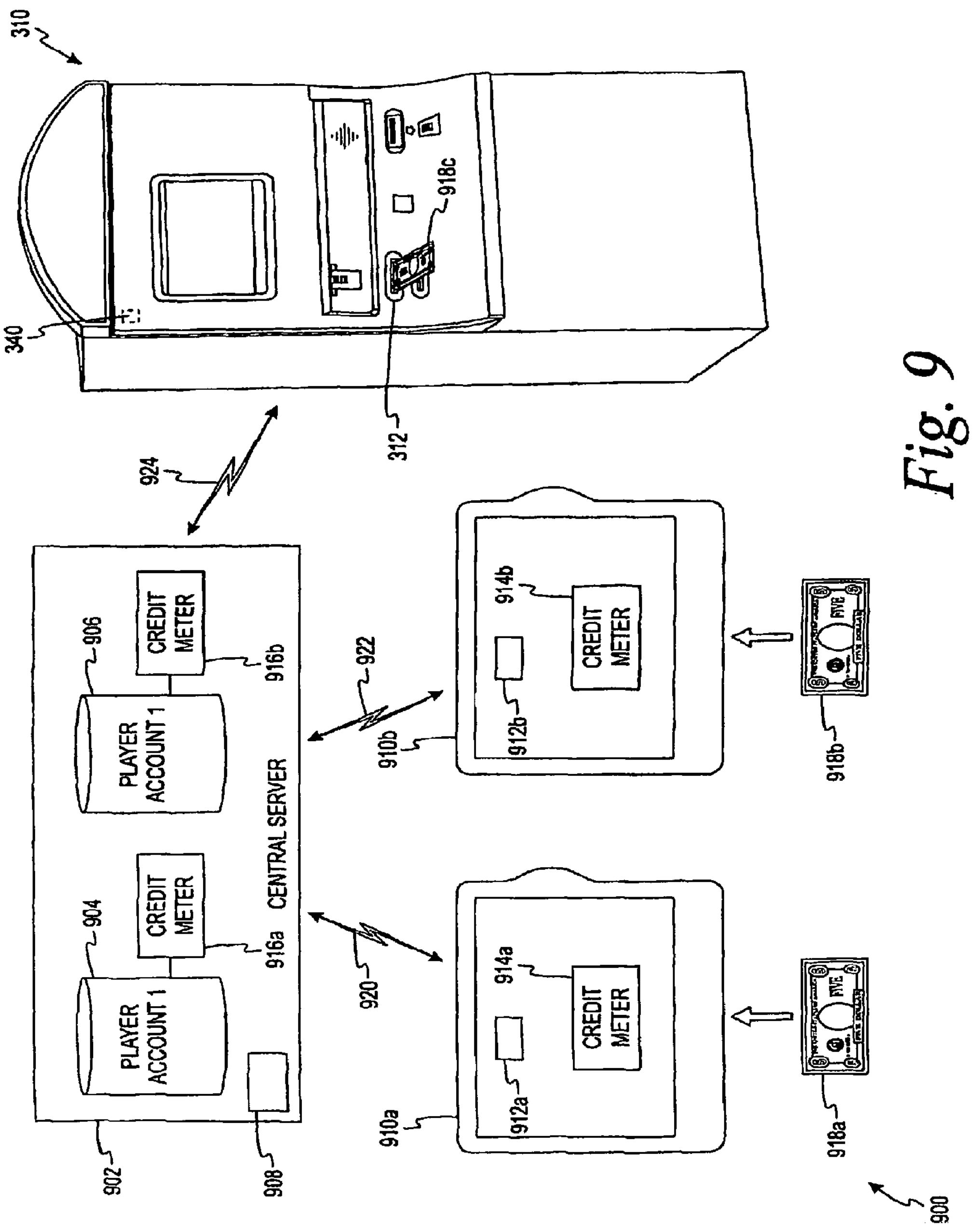
FIG. 9 is a functional illustration of a system and method for adding and deducting funds from one or more player accounts that are stored on a remote central server system according to an embodiment of the present invention.

FIG. 9 is a functional illustration of a system 900 of adding and deducting funds from one or more player accounts 904, 906 that are stored on a remote central server system 902. The central server system 902 includes a communication interface 908 for communicating with respective communication interfaces of gaming machines, which may be handheld gaming machines 912*a*, 912*b* of handheld gaming machines 910*a*, 910*b* (which have all of the features of the handheld gaming machine 110) via respective communication links 920, 922, which are preferably wireless communication links utilizing, for example, the 802.11 Ethernet protocol or similar wireless LAN or WAN protocol. Each handheld gaming machine 910*a*, 910*b* includes a respective credit display 914*a*, 914*b*, which is typically implemented as a software object (e.g., a memory storing a number of credits, graphically depicted on a display of the handheld gaming machine). The credit displays 914*a*, 914*b* are updated in response to the handheld gaming machines 910*a*, 910*b* receiving signals representative of an amount of funds deducted from the player accounts 904, 906. Alternately, cash or substitute currency media 918*a*, 918*b* (such as tokens 300 shown in FIG. 4*b* or barcoded tickets 350) can be received at the handheld gaming machines 910*a*, 910*b*, causing the player accounts 904, 906 to be updated accordingly in response to signals communicated from the handheld gaming machines 910*a*, 910*b* via the communication links 920, 922, respectively. In other embodiments, cash 918*c* or an amount charged to/withdrawn from a credit/debit card can be inserted into the kiosk 310, which causes the player accounts 904, 906 to be updated accordingly in response to signals communicated from the kiosk 310 via the communication link 924.

Alternately, each player account 904, 906 may be linked to a credit meter 916*a*, 916*b*, respectively, in the central server 902. A player can transfer funds from the player account 904, 906 to the respective credit meter 916*a*, 916*b* from the handheld gaming machine 910*a*, 910*b*, and the player may perceive that the funds are actually being transferred to the credit display 914*a*, 914*b* on the handheld gaming machine 910*a*, 910*b* even though in fact the transfers occur on the central server 902. Again, the credit displays 914*a*, 914*b* are graphically updated on the handheld gaming machines 910*a*, 910*b*, but the actual credit meter data is stored in the credit meters 916*a*, 916*b* on the central server 902. This way, no funds are associated with the handheld gaming machine 110, so that if it loses its data suddenly or the data is corrupted, no funds are actually lost because they remain on the central server 902. Thus, from the player's perspective, it may appear as though funds are actually being transferred to the handheld gaming machine 110, just as if a player were inserting cash into a freestanding gaming machine 10, but in reality the transactions are quite secure and occurring on a system remote from the handheld gaming machines 910*a*, 910*b*.

Figure 10A:
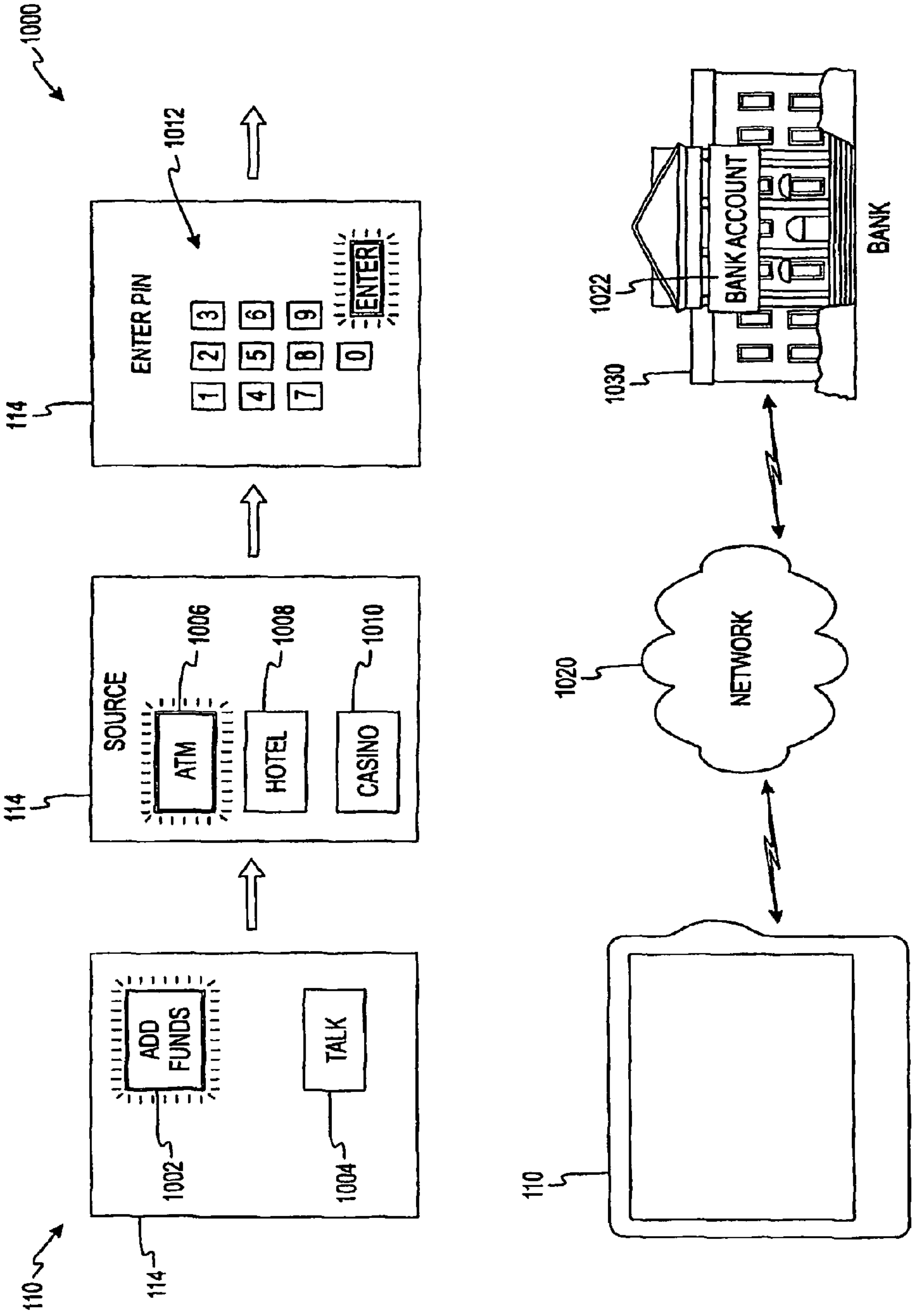
FIGS. 10*a* and 10*b* are functional illustrations of two different methods of adding funds from various sources via a handheld gaming machine according to an embodiment of the present invention.
Figure 10B:
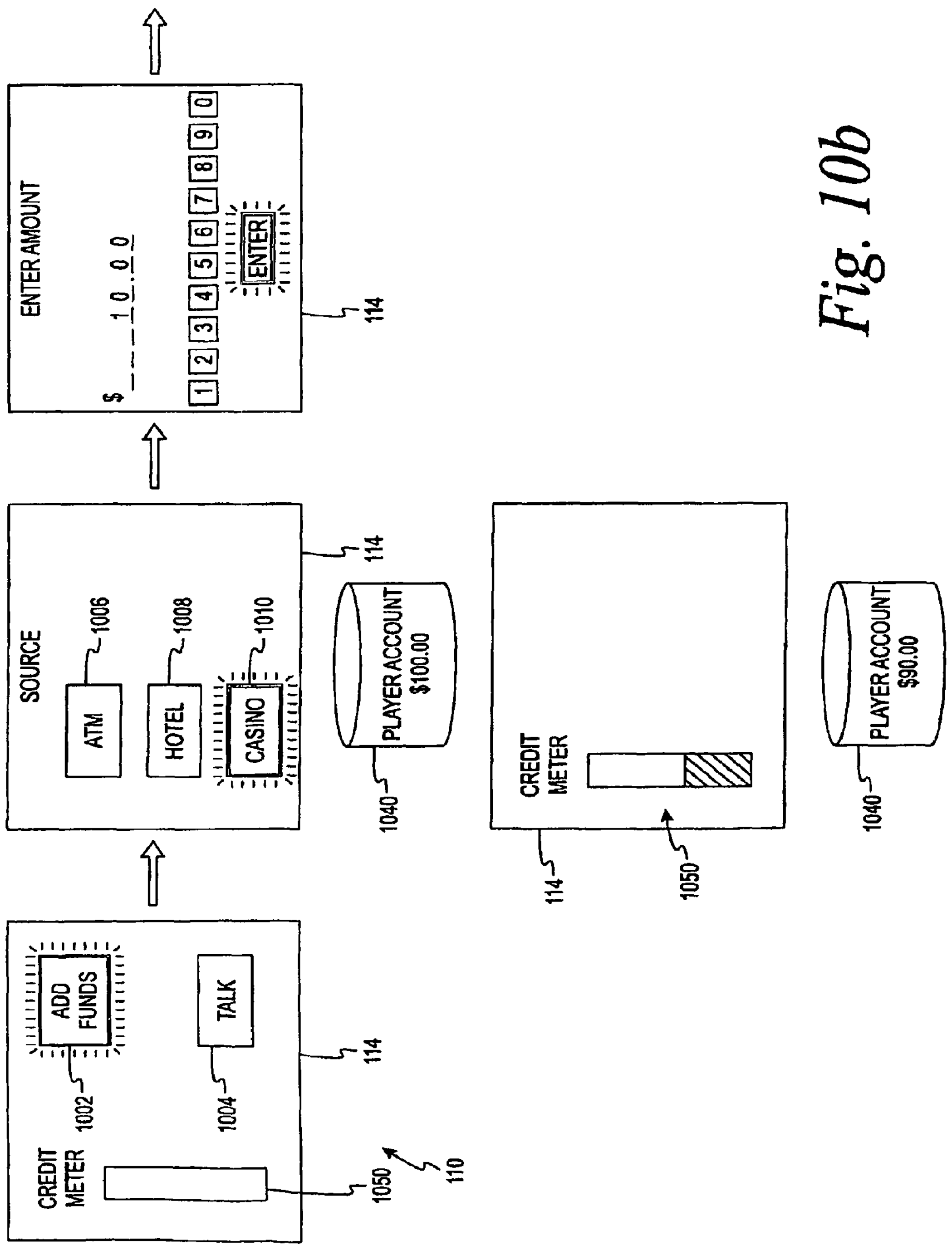

FIGS. 10*a* and 10*b* are functional illustrations of two different methods of adding funds from various sources via a handheld gaming machine 110. In FIG. 10*a*, the player is presented on the primary display 114 (or secondary display 116) with at least two buttons, an ADD FUNDS button 1002 and a TALK button 1004. These buttons may be virtual in the sense that they represent software objects, as described above. The player touches the ADD FUNDS button 1002 to indicate that the player wishes to add more funds to the handheld gaming machine 110. An identification code is associated with the handheld gaming machine 110 to distinguish it from other handheld gaming machines in the wagering environment. In FIG. 10*a*, the handheld gaming machine is assigned an identification code 1572 (it should be understood that any alphanumeric string can be used as an identification code).

Next, the display 114 displays a number of possible sources of funds, such as an ATM 1006, a hotel account 1008, or a player account 1010 associated with the casino. The hotel account 1008 may be associated with the player's room number if the player is a guest there, or it may be an account similar to a player account that is associated with the hotel. The player touches the ATM button 1006 and a numeric keypad 1012 is displayed prompting the player to enter the PIN number for accessing money from a remote bank account. The handheld gaming machine 110 communicates with the player's bank account 1022 stored in a bank 1030 via a network 1020, such as the ATM network, and the requested amount of funds is transferred from the bank account 1022 to the handheld gaming machine 110 or to a remote server 50 that stores a player account. Thus, from the handheld gaming machine 110, the player can access funds in a bank account and transfer some of those funds to a player account that resides on the handheld gaming machine 110 or in a remote server 50.

Alternately, the player may supply the casino, hotel, or other establishment a bank or other financial institution routing and account number, which is linked to the player account 1040. The player can withdraw funds directly from the handheld gaming machine 110 by requesting withdrawals on the handheld gaming machine 110, which requests are communicated via signals in a secure communication link from the handheld gaming machine 110 to a remote computer 50. The remote computer utilizes the routing and account number provided by the player to transfer funds from the player's bank account 1022 via the network 1020. To the player, it appears that the bank account is being accessed directly from the handheld gaming machine 110; however, the actual transfers take place via a secure communication link between the computer where the player account 1040 resides and the player's bank account 1022. Thus, the PIN number 1012 may be a secret PIN number or password the player is assigned by the casino, and the player enters this PIN number 1012 or password to cause the direct withdrawal from the bank account using the routing and account number information previously supplied by the player to the casino. It should be noted that the present invention is not limited to the use of PIN numbers and passwords, but contemplates any secure information (such as biometric information) known to the player or associated with the player as a means for authorizing a withdrawal from a bank account. The same principles apply to a player's credit card account where the player provides a credit card to the casino to which funds are charged as they are requested by the player in accordance with the present invention.

In FIG. 10*b*, when a credit meter 1050 runs low on the handheld gaming machine 110, the player can touch the ADD FUNDS button 1002 followed by the CASINO button 1010. A player account 1040 stored either in the handheld gaming machine 110 or in a remote server 50 currently includes $100.00 of funds. Once the player's identity is authenticated, the player is prompted to enter an amount of funds to withdraw from the player account 1040. In the illustrated embodiment, the player requests $10.00 to be transferred from the player account 1040. Finally, the credit meter 1050 is updated accordingly on the display 114 and the player account 1040 is also updated to reflect a balance of $90.00.

Figure 10C:
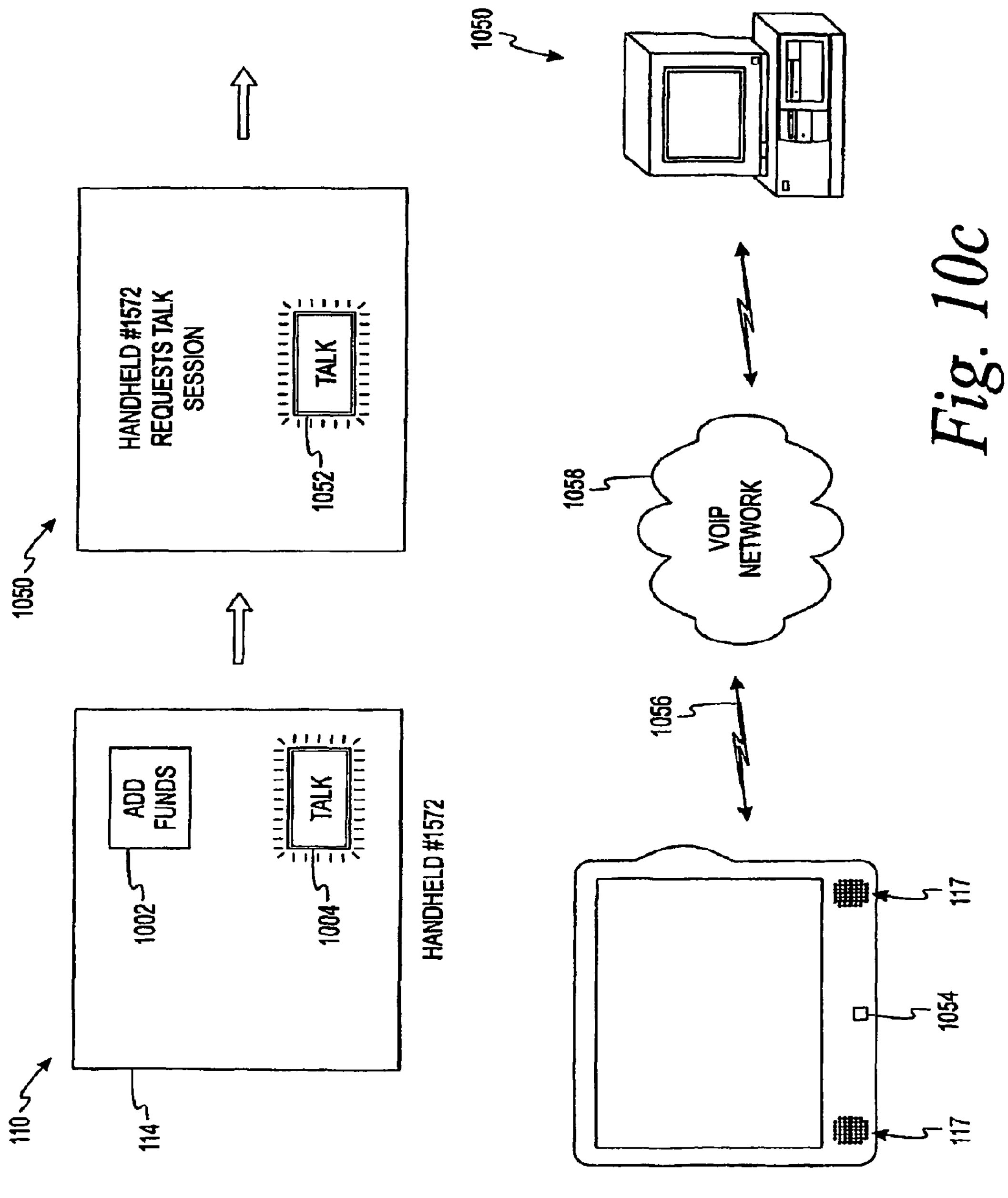
FIG. 10*c* is a functional diagram of a method of establishing a talk session between a handheld gaming machine and a remote computer according to an embodiment of the present invention.

FIG. 10*c* is a functional diagram of a method of establishing a talk session between a handheld gaming machine 110 and a remote computer 1050. The player touches the TALK button 1004 and a display of the remote computer 1050 displays the identification code (1572 in this example) of the handheld gaming machine 110 that requests a talk session. The operator or attendant touches a TALK button 1052 to establish a talk session with the player of the handheld gaming machine 110. The player speaks into a microphone 1054 and incoming audio speech is broadcast through the speakers 117 on the handheld gaming machine 110. The handheld gaming machine 110 communicates via a voice-over-internet-protocol (VOIP) network 1058 utilizing communication link 1056 with the remote computer 1050. Any other suitable voice-enabled protocol may be utilized to establish and maintain the talk session. The player can use the talk session to request funds, a new battery, a new handheld gaming machine, or other player services. For example, some casino patrons perceive that certain gaming machines are "lucky" or "unlucky," and may wish to swap the handheld gaming machine for a new one to change their luck. By providing at least the option to the casino patron, the casino patron is motivated to continue placing wagers on the handheld gaming machine.

Each of these embodiments and obvious variations thereof is contemplated as falling within the spirit and scope of the claimed invention, which is set forth in the following claims.

What is claimed is:

1. A method of transferring funds for playing a wagering game, comprising:

storing a player account associated with a player in an account server;

capturing an image of a ticket via a sensor on a portable handheld device carried by the player, the portable handheld device being remotely located from the account server;

obtaining, by one or more processors, an amount of funds associated with the ticket based on the captured image of the ticket;

communicating the amount of funds to the account server via the portable handheld device; and increasing a balance of the player account in the account server by the amount of funds; and responsive to a wager drawn from the player account, conducting the wagering game via the portable handheld device.

2. The method of claim 1, wherein the sensor is a full image scanner.

3. The method of claim 1, wherein the portable handheld device interprets the image to determine the amount of funds.

4. The method of claim 1, wherein the portable handheld device sends the image of the ticket to the account server and the account server interprets the image to determine the amount of funds.

5. The method of claim 1, wherein the portable handheld device includes an identity recognition module to receive identity information from the player.

6. The method of claim 1, wherein the communicating is performed via a wireless communication link between the account server and the portable handheld device.

7. The method of claim 1, wherein the ticket is encoded with a barcode associated with the amount of funds.

8. The method of claim 1, wherein the funds include cash.

9. A method of disbursing funds to players carrying portable handheld devices, the method comprising:

storing a player account associated with a player in an account server;

obtaining, by one or more processors, an amount of funds associated with a ticket based on a captured image of the ticket from a sensor on a portable handheld device carried by a player, the portable handheld device being remotely located from the account server;

receiving the amount of funds by the account server from the portable handheld device; and increasing a balance of the player account by the amount of funds in the account server; and responsive to a wager drawn from the player account, allowing the conducting of a wagering game via the portable handheld device.

10. The method of claim 9, wherein the sensor is a full image scanner.

11. The method of claim 9, wherein the portable handheld device interprets the image to determine the amount of funds.

12. The method of claim 9, wherein the portable handheld device sends the image of the ticket to the account server and the account server interprets the image to determine the amount of funds.

13. The method of claim 9, wherein the portable handheld device includes an identity recognition module to receive identity information from the player.

14. The method of claim 9, wherein the communicating is performed via a wireless communication link between the account server and the portable handheld device.

15. The method of claim 9, wherein the ticket is encoded with a barcode associated with the amount of funds.

16. The method of claim 9, wherein the funds include cash.

17. An account system to disburse funds to players carrying portable handheld gaming devices, the account system comprising:

a memory device storing a player account associated with a player;

a communications interface for accepting a communication from a portable handheld gaming device, wherein the portable handheld device includes a sensor that captures an image of a ticket, the portable handheld device being remotely located from the memory device; and one or more processors to obtain an amount of funds associated with the ticket based on the communication from the portable handheld device, the one or more processors increasing a balance of the player account stored in the memory device by the amount of funds and authorizing drawing of a wager from the player account to conduct a wagering game on the portable handheld gaming device.

18. The account system of claim 17, wherein the ticket is encoded with a barcode associated with the amount of funds.

19. The account system of claim 17, wherein the funds include cash.

20. A portable handheld gaming device comprising:

a sensor to capture an image of a ticket;

one or more processors to obtain an amount of funds associated with the ticket based on the captured image of the ticket;

a communications module to communicate the amount of funds to an account server being remotely located from the portable handheld gaming device;

an input device to input a wager based on a player account including the amount of funds in the account server remotely located from the portable handheld gaming device; and a display displaying a wagering game playable in response to the input wager.

* * * * *